United States Patent
Gomes et al.

(10) Patent No.: US 9,210,211 B2
(45) Date of Patent: Dec. 8, 2015

(54) REMOTE AUTOMATED UPDATES FOR AN APPLICATION

(71) Applicant: Hulu, LLC, Santa Monica, CA (US)

(72) Inventors: Jonathan Hayden Pitcairn Gomes, Seattle, WA (US); Daniel Honig Bear, Seattle, WA (US); Lyudmil Vladimirov Antonov, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 355 days.

(21) Appl. No.: 13/891,746

(22) Filed: May 10, 2013

(65) Prior Publication Data

US 2014/0156805 A1 Jun. 5, 2014

Related U.S. Application Data

(60) Provisional application No. 61/645,163, filed on May 10, 2012.

(51) Int. Cl.
*H04L 29/08* (2006.01)

(52) U.S. Cl.
CPC .............. *H04L 67/06* (2013.01); *H04L 67/34* (2013.01)

(58) Field of Classification Search
CPC ................................ H04L 67/06; H04L 67/34
See application file for complete search history.

(56) References Cited

U.S. PATENT DOCUMENTS

| | | | |
|---|---|---|---|
| 2005/0068912 A1* | 3/2005 | Scott et al. | 370/310 |
| 2008/0098006 A1* | 4/2008 | Pedersen et al. | 707/10 |
| 2010/0162229 A1* | 6/2010 | Tsuk et al. | 717/175 |
| 2011/0047620 A1* | 2/2011 | Mahaffey et al. | 726/23 |
| 2014/0156833 A1* | 6/2014 | Robinson | 709/224 |
| 2015/0088982 A1* | 3/2015 | Johnson et al. | 709/203 |

* cited by examiner

*Primary Examiner* — Nicholas Taylor
*Assistant Examiner* — Tania Pena-Santana
(74) *Attorney, Agent, or Firm* — Fountainhead Law Group PC

(57) ABSTRACT

In one embodiment, a method updates a media program streaming application for a media program streaming service. The method downloads the application, which includes a bootstrap application, through a distribution site. The bootstrap application receives a manifest from a remote server that lists remote core files. The bootstrap application determines if a core memory contains updateable core files corresponding to the remote core files. The method determines if an updateable core file is present in the core memory that matches a remote core file and loads the updateable core file from the core memory into a memory. If an updateable core file that matches the remote core file is not present in the core memory, the method requests the remote core file from the remote server and loading the received remote core file into the memory. The method then executes the core files in the memory without recompilation.

20 Claims, 11 Drawing Sheets

```
Manifest
  600 {
        "coreScripts": // Array of remote core files
             ["core_1.js", "core_2.js", "core_3.js", "core_4.js", "core_5.js",
    "core_6.js"],
        "cache": // Dictionary with file sizes and hash codes for each file
        {
             "core_6.js":
             {
         604  { "hash": "9373c245df245f318e5d68617ce033a0", // Hash of file contents
               "size": 50676 // Overall size of file
             },
             "core_5.js":
             {
                 "hash": "47b9bbeed4f8bfc01462bb5f3b526e29",
                 "size": 215934
             },
             "core_3.js":
             {
                 "hash": "c7b5167bc3cf686e3d215c05720eb87c",
                 "size": 199848
             },
  602 {      "core_2.js":
             {
                 "hash": "0738ccfd58abc651f29dc80196eecdce",
                 "size": 141444
             },
             "core_1.js":
             {
                 "hash": "4f6683cf9043db9e9b2dc559cacaebed",
                 "size": 213515
             },
             "core_4.js":
             {
                 "hash": "018478eb5c9e84e21cd5a801070830da",
                 "size": 61715
             }
  606  },
        "urlRoot": // Root where to download files from
             "https://domain.com/2012.4.12.846bdc8fb6593d65",
        "version": // Version of RJS remote core
             "1.0.1f682f9a0182bbc51062c3707231f768" // major, minor, hash of the file hashes
     }
```

FIG. 6

REMOTE AUTOMATED UPDATES FOR AN APPLICATION

CROSS REFERENCE TO RELATED APPLICATIONS

The present disclosure claims priority to U.S. Provisional App. No. 61/645,163, entitled "Remote Automated Updates", filed May 10, 2012, the contents of which is incorporated herein by reference in its entirety.

BACKGROUND

A user may use a "living room" device, such as a game console, set-top box, streaming media device, smartphone, tablet, or other computing device, to access a streaming media program service to have media programs streamed to the device. However, before accessing the service, the user must download an application for the streaming media program service to the device. In some cases, a distribution site regulates which applications a device can install. For example, an original equipment manufacturer (OEM) that sold the device may maintain an OEM distribution site that aggregates available applications that a device can install. In this case, a user of the device must go to the distribution site to download the streaming media program application from the streaming media program service. In another example, the distribution site may pre-install approved applications on the device. In either case, for the streaming media program service to have an application pre-installed on the device or be available for download on the distribution site, the streaming media service has to have the application approved by the distribution site. This usually involves an approval process in which the streaming media program service submits the application to the owner of the distribution site for approval.

After releasing the application, the streaming media program service may update the application very frequently to add features, fix bugs, etc. The update experience may be complicated and may require a user to perform many manual steps. For example, a user may launch the streaming media program service application to watch a media program. However, instead of having the streaming media program service application launched, the user encounters a modal dialog instructing the user to manually download and reinstall the streaming media program service application from a different menu. The user then has to then exit the streaming media program service application and launch another menu or application. For example, the other menu may be page for the distribution site where the user can update applications. Then, the user has to search for the streaming media program service application in the menu, select the streaming media program service application, and start the update. The update process then downloads and reinstalls the application. Once finished, the user can go back to the original streaming media program service application and re-launch the application.

SUMMARY

In one embodiment, a method updates a media program streaming application for a media program streaming service. The method downloads the media program streaming application, which includes a bootstrap application, through a distribution site to a computing device. The initial installation of the media program streaming application is coordinated through the distribution site to approve the media program streaming application for download. Upon startup of the media program streaming application, the method runs the bootstrap application to determine if the media program streaming application on the computing device needs to be updated. The bootstrap application sends a request for a manifest to a remote server and receives the manifest from the remote server where the manifest lists a set of remote core files stored at the remote server. The bootstrap application reviews the manifest to determine if a core memory on the computing device contains a set of updateable core files that correspond to the set of remote core files. For each remote core file, the method performs: if an updateable core file is present in the core memory that matches a remote core file, loading the updateable core file from the core memory into an application execution memory and if the updateable core file that matches the remote core file is not present in the core memory, requesting the remote core file from the remote server, receiving the remote core file from the remote server, and loading the received remote core file into the application execution memory, the remote core file being received without communicating with the distribution site. The method then executes the loaded updateable core files and the received remote core files in the application memory without recompilation of the loaded updateable core files or remote core files to provide the streaming media program service.

In one embodiment, a non-transitory computer-readable storage medium contains instructions for updating a media program streaming application for a media program streaming service. The instructions, when executed, control a computer device to be configured for: downloading the media program streaming application including a bootstrap application through a distribution site, wherein initial installation of the media program streaming application is coordinated through the distribution site to approve the media program streaming application for download; upon startup of the media program streaming application, running the bootstrap application to determine if the media program streaming application needs to be updated; sending, by the bootstrap application, a request for a manifest to a remote server; receiving, by the bootstrap application, the manifest from the remote server, wherein the manifest lists a set of remote core files stored at the remote server; reviewing, by the bootstrap application, the manifest to determine if a core memory on the computing device contains a set of updateable core files that correspond to the set of remote core files; for each remote core file, performing: if an updateable core file is present in the core memory that matches a remote core file, loading the updateable core file from the core memory into an application execution memory; and if the updateable core file that matches the remote core file is not present in the core memory, requesting the remote core file from the remote server, receiving the remote core file from the remote server, and loading the received remote core file into the application execution memory, the remote core file being received without communicating with the distribution site; and executing the loaded updateable core files and the received remote core files in the application execution memory without recompilation of the loaded updateable core files or remote core files to provide the streaming media program service.

In one embodiment, a system for updating a media program streaming application for a media program streaming service is provided. The system includes: a remote server storing a remote core for the media program streaming application and a manifest listing a set of remote core files for the remote core; and a client device configured for: downloading the media program streaming application including a bootstrap application through a distribution site, wherein initial installation of the media program streaming application is coordinated through the distribution site to approve the media program streaming application for download; upon startup of the media program streaming application, running the bootstrap application to determine if the media program streaming application needs to be updated; sending, by the bootstrap application, a request for a manifest to the remote server; receiving, by the bootstrap application, the manifest from the remote server, wherein the manifest lists a set of remote core files stored at the remote server; reviewing, by the bootstrap application, the manifest to determine if a core memory on the computing device contains a set of updateable core files that correspond to the set of remote core files; for each remote core file, performing: if an updateable core file is present in the core memory that matches a remote core file, loading the updateable core file from the core memory into an application execution memory; and if the updateable core file that matches the remote core file is not present in the core memory, requesting the remote core file from the remote server, receiving the remote core file from the remote server, and loading the received remote core file into the application execution memory, the remote core file being received without communicating with the distribution site; and executing the loaded updateable core files and the received remote core files in the application execution memory without recompilation of the loaded updateable core files or remote core files to provide the streaming media program service.

The following detailed description and accompanying drawings provide a better understanding of the nature and advantages of particular embodiments.

BRIEF DESCRIPTION OF THE DRAWINGS

FIG. 6 depicts an example of a manifest according to one embodiment.

DETAILED DESCRIPTION

Described herein are techniques for an automated update system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
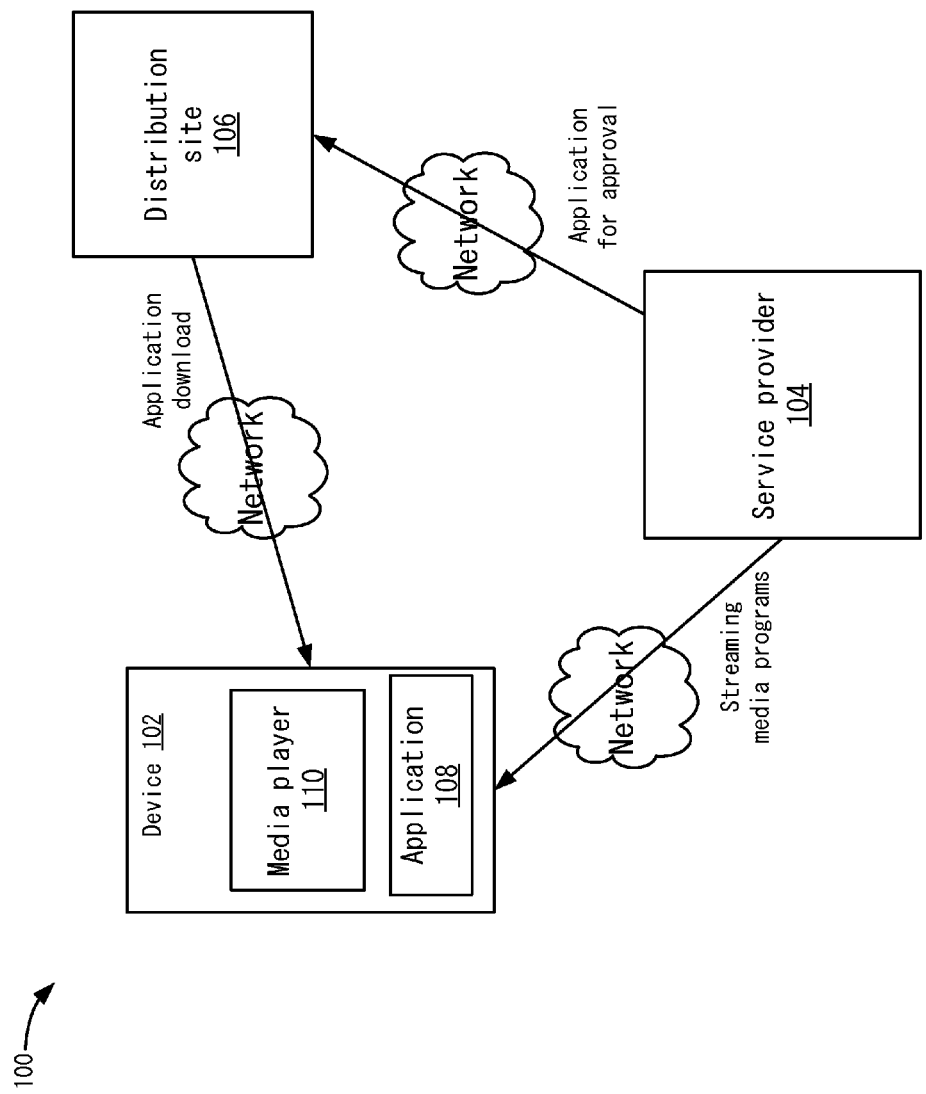
FIG. 1 depicts a simplified system for installing an application on a device according to one embodiment.

FIG. 1 depicts a simplified system 100 for an application 108 on a device 102 according to one embodiment. System 100 includes a service provider 104 and a distribution site 106.

Service provider 104 may provide a service through application 108. For example, service provider 104 provides a media program streaming service that a user can use to stream media programs to device 102 using application 108. Media programs may include videos, audio files (e.g., music), pictures, and other audio/visual content. In one example, users use application 108 to select videos to stream to a media player 110 on device 102. Although the media program streaming service is described, it will be recognized that other services may be appreciated, such as application 108 may be providing a game, service, social networking site, etc.

Before device 102 can access the service, device 102 needs to download application 108. In one embodiment, the initial download of application 108 needs to be through distribution site 106. Distribution site 106 is maintained by an owner of distribution site 106, such as an original equipment manufacturer (OEM) of device 102, a company associated with a platform or operating system of device 102, or an owner of an application marketplace. Distribution site 106 regulates which applications can be installed on device 102. Thus, a user of device 102 cannot directly download and install application 108 from service provider 104 without going through distribution site 106. As discussed briefly above, to release an application 108 on distribution site 106, service provider 104 first provides application 108 to the owner of distribution site 106. The owner would then evaluate application 108 for approval. Once approved, distribution site 106 may offer application 108 for download or pre-install application on device 102.

At some point, a user of device 102 may go to distribution site 106 and request installation of application 108. In response, distribution site 106 allows the download of application 108 to device 102. In one example, a user of a smartphone, game console, or other living room device may open a page for distribution site 106 that shows various applications that can be installed. The user may then select the media program streaming service application from service provider 104. Device 102 downloads the media program streaming service application 108 and installs application 108 on device 102. Thereafter, the user may use application 108 to access the media program streaming service to have media programs streamed to device 102. Downloading application 108 from distribution site 106 may be different from opening a web browser and downloading a web page. Once downloaded, application 108 is stored on device 102 for future use, and will not require the user to go to distribution site 106 to access application 108 in the future. In most instances, application 108 will include code that is designed for device 102 and must be run natively. As application 108 is run, addition code is not downloaded from a remote source, such as a web page is not downloaded to display additional information. The use of the native application can be based on a need for additional functionality that a browser on the device cannot provide, for performance purposes, or for platforms that do not support a full web browser experience and only support native code. Application 108 can also be accessed offline (e.g., without a connection to the Internet).

As discussed above, distribution site 106 may also pre-install application 108 on device 102. In this case, device 102 may have the application pre-installed when a user purchases device 102. Although the user does not have to download application 108 from distribution site 106, service provider 104 still has to have application 108 approved by distribution site 106 before pre-installation.

At some point after installation on device 102, service provider 104 updates application 108. For example, service provider 104 may add new features, fix bugs, or enhance features for application 108. To provide the best experience, it is desirable that application 108 is updated with minimal disruption to the user. Particular embodiments provide users with a seamless update experience that may be optimized for their device and viewing experience. For example, when the user launches the application to view a media program, in the background, new updates for the service are detected, and the application seamlessly updates without requiring user interaction. The user may proceed to a menu of application 108 and start watching the media program without any disruption as the application updates are loaded (e.g., patched) in the background upon startup. In another example, some devices, such as smart televisions (TVs) require a full firmware update to update any individual application residing on the smart TV. That is, the company that owns the smart TV pushes a major update that switches out all of the code for the entire smart TV to update a single application residing on the smart TV. The company performs these updates infrequently due to the inconvenience. Thus, particular embodiments would allow updates to be performed more frequently and service provider 104 does not need to wait until the smart TV is updated. Also, the company may stop supporting the smart TV as the product ages. Then, it is possible that the company will refuse to push any future firmware updates to the smart TV. In these situations, particular embodiments would allow service provider 104 to continue to update application 108

Figure 2:
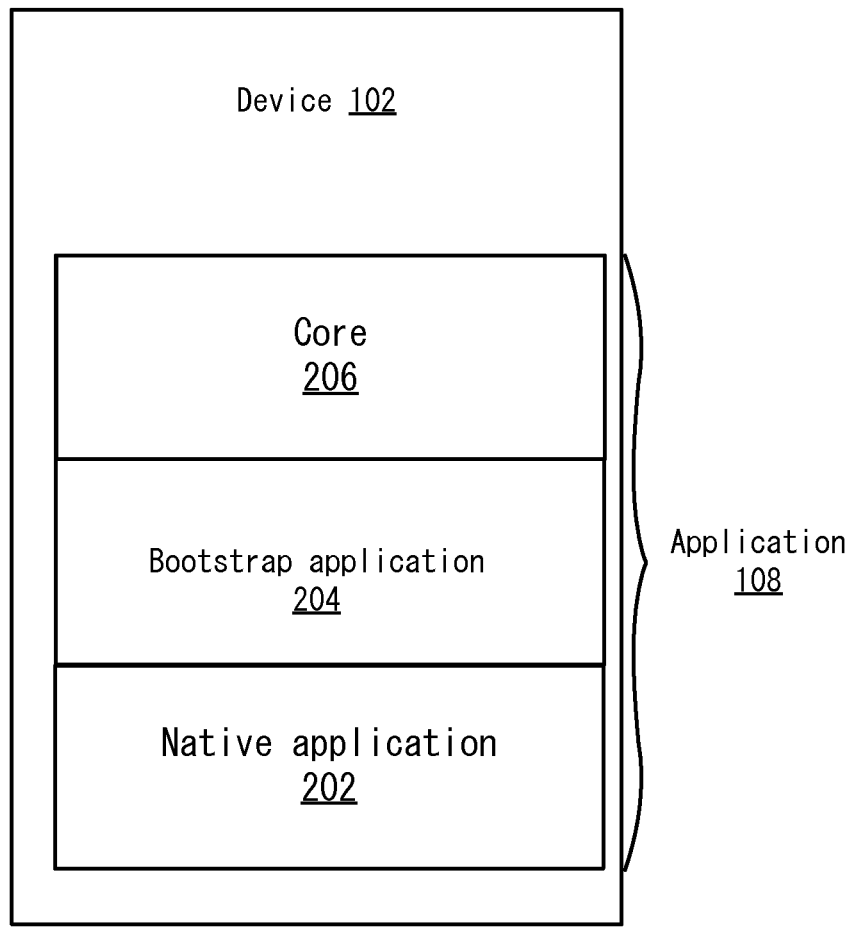
FIG. 2 depicts an example of an application according to one embodiment.

Before discussing the update process, a structure of application 108 will be described. FIG. 2 depicts an example of application 108 according to one embodiment. In one embodiment, application 108 includes user interface and application logic for the media program streaming service. As shown, application 108 includes bootstrap application 204, core 206, and native application 202. Native application 202 may execute bootstrap application 204 and core 206. Bootstrap application 204 and core 206 may be interpreted applications, such as interpreted Javascript™ applications. An interpreted application does not need explicit compilation to run. Rather, native application 202 may execute bootstrap application 204 and core 206 directly without compilation of bootstrap application 204 and core 206. For example, native application 202 may be a native application running on device 102 that includes an interpreter, such as a Javascript™ interpreter, that can interpret software code of bootstrap application 204 and core 206 without requiring compilation of bootstrap application 204 and core 206. Native application 202 may be coded in a native language (e.g., C++) supported by device 102 that enables the device to interpret and execute bootstrap application 204 and core 206. Native application 202 also provides connections between the base application programming interfaces (APIs) of device 102 and bootstrap application 204 and core 206.

Bootstrap application 204 may be logic that is executed every time application 108 is launched on device 102. For example, every time a user opens application 108, bootstrap application 204 runs. The actions of bootstrap application 204 will be described in more detail below.

Core 206 may be files that native application 202 executes to provide the service. For example, core 206 may include application logic for the user interface and other features that allow a user to stream media programs to device 102. Once bootstrap application 204 runs, native application 202 executes core 206 to provide the media program streaming service.

Particular embodiments leverage bootstrap application 204 to provide the update experience. For example, when the user launches application 108 to access the media program streaming service, native application 202 first executes bootstrap application 204. In the background, bootstrap application 204 may detect whether new updates for the media program streaming service are available, and update application 108 without requiring any user interaction or navigation to another menu. In one embodiment, bootstrap application 204 may load the updates (e.g., patch) to application 108 in the background while the user can start streaming media programs.

In one embodiment, bootstrap application 204 may update application 108 without requiring device 102 (or bootstrap application 204) to contact distribution site 106. That is, bootstrap application 204 may contact a remote server directly to receive the updates without having to receive the updates through distribution site 106. This allows service provider 104 to provide updates without requiring the user to exit application 108 and open distribution site 106. This provides a better user experience as the user does not have to continually access distribution site 106 to update application 108. Also, service provider 104 can quickly deliver new features on application 108, fine-tune application 108, reduce loading time of application 108, optimize application 108 for different user profiles, immediately fix problems that are discovered for application 108, and reduce support costs for new updates.

Figure 3:
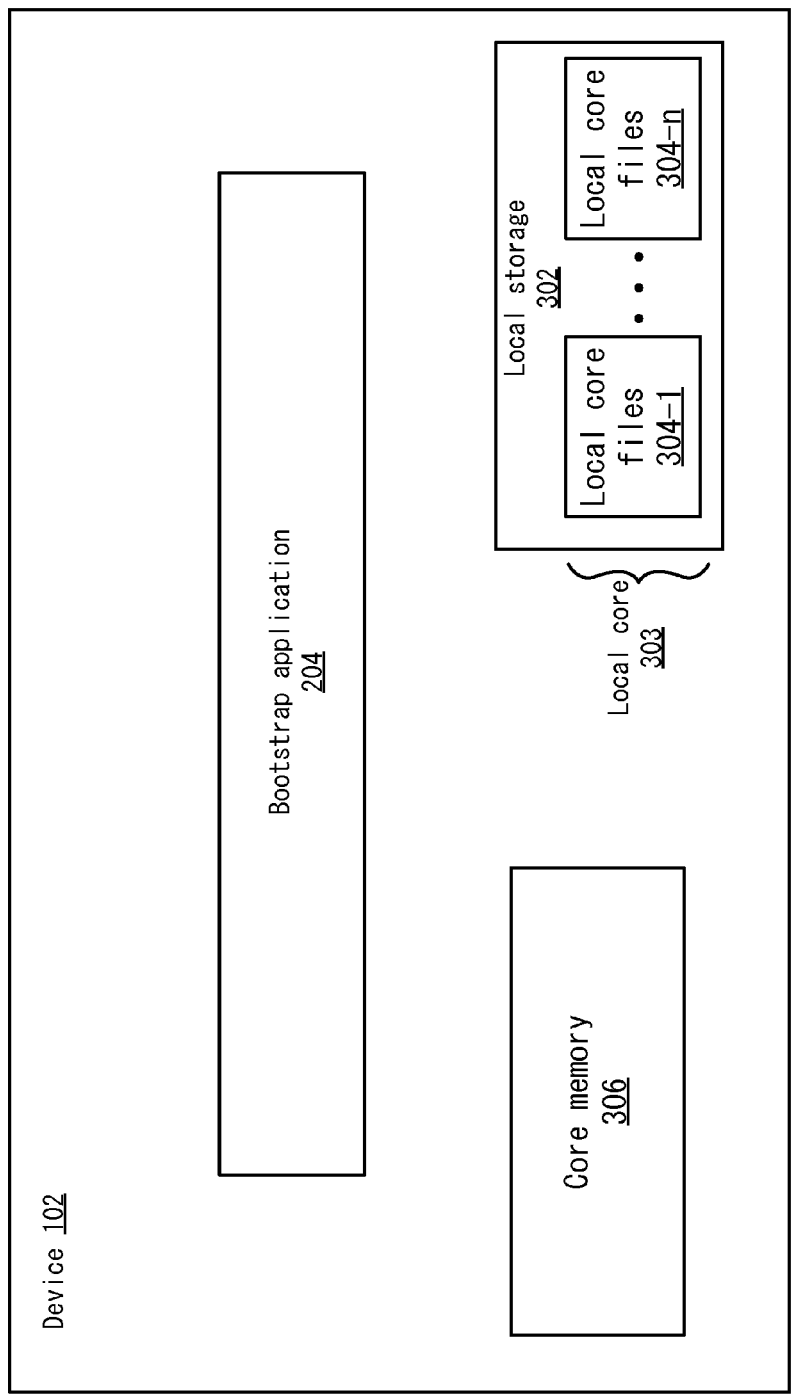
FIG. 3 depicts an example installation of the application in the device according to one embodiment.

To allow application 108 to automatically update without going through distribution site 106, bootstrap application 204 is included in the application that is initially provided to distribution site 106, and bootstrap application 204 includes logic configured to access a remote server to detect updates directly without going through distribution site 106. Before describing the update process, a state of device 102 upon initial installation will be described. FIG. 3 depicts an example installation of application 108 in device 102 according to one embodiment. As shown, bootstrap application 204 has been installed on device 102. Additionally, local storage 302 includes a local core 303 that includes local core files 304-1-304-n. Local core files 304-1-304-n may be files for the core of application 108 that were downloaded from distribution site 106. Distribution site 106 has approved native application 202, bootstrap application 204, and local core 303 for download and installation to device 102.

Local storage 302 may be persistent storage on device 102. That is, when device 102 is shut down or restarted, local core 303 is persistently stored and not deleted upon shut down or restart. Local core 303 cannot be modified without an update through distribution site 106. Additionally, a user would have to uninstall application 108 to delete local core 303 from local storage 302.

Device 102 also includes a core memory 306 that stores a remote core that is downloaded from a remote server. Core memory 306 may be persistent storage that allows the core stored within core memory 306 to be modified (unlike local core 303). Although shown separately, core memory 306 may be part of local storage 302. In one embodiment, core memory 306 is where device 102 stores saved information for application 108. By using core memory 306 to store a core, particular embodiments may update application 108. As discussed above local core 303 cannot be modified without an update through distribution site 106. However, a core stored in core memory 306 may be updated or modified.

Figure 4:
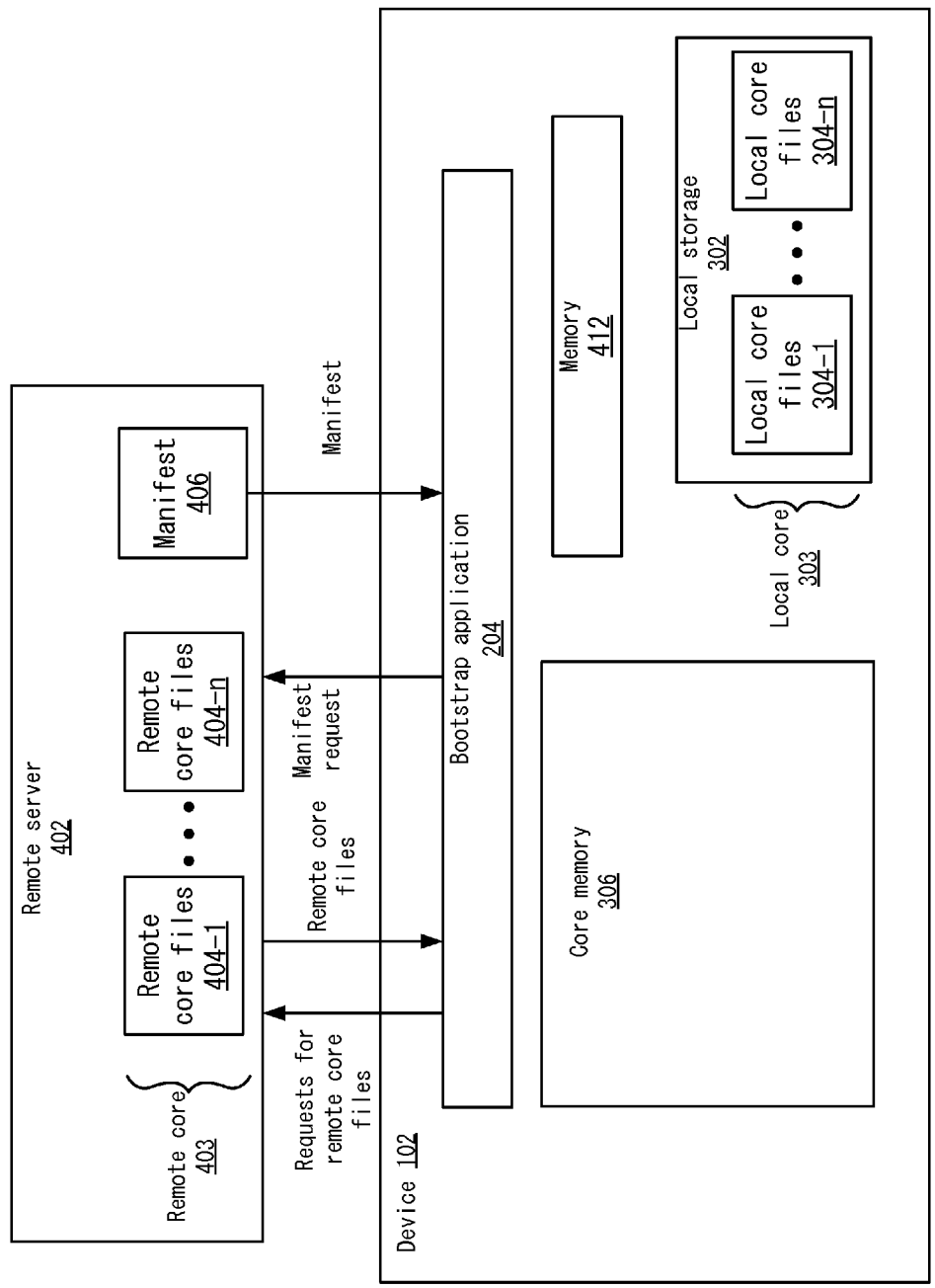
FIG. 4 depicts an example of requesting a remote core from a remote server according to one embodiment.

When application 108 is initially accessed for the first time, core memory 306 does not include a core. There also may be other times when core memory 306 does not include a core, such as when device 102 clears core memory 306. When core memory 306 does not include a core, device 102 may download an entire remote core from a remote server, load local core 303 from local storage 302, or load a combination of local core 303 and the remote core. FIG. 4 depicts an example of requesting a remote core from a remote server 402 according to one embodiment. A remote server 402 includes a remote core 403 that includes the latest updates for application 108. For example, remote core files 404-1-404-n include updated core files for application 108. Remote server 402 may be remotely located from device 102 and may be accessed via a wide area network (WAN). Also, in one embodiment, device 102 does not access remote server 402 through distribution site 106.

In addition to including remote core 403, remote server 402 includes a manifest 406 that lists the remote core files 404-1-404-n that are included in the latest remote core 403. For example, manifest 406 lists remote core files 404-1-404-n by filename. Manifest 406 may also include parameters that uniquely identify each remote core file 404, such as using a hash of the file contents and a size of the file. Manifest 406 may include other information that can be used to uniquely identify each remote core file 404. Although manifest 406 is discussed, particular embodiments may not use manifest at all. For example, bootstrap application 204 may just download all of remote core 403 or send a request for files in a folder.

To execute application 108, device 102 needs to load core files for application 108 into memory 412, which may be random access memory (RAM), cache memory, or other memory in which applications are executed. To allow for the most recent application 108 to be used, bootstrap application 204 communicates with remote server 402 to determine if any updates are available. In this example, device 102 does not include a core that is stored in core memory 306. In this case, bootstrap application 204 may load an entire core from remote server 402 into memory 412, or may load some local core files 304 into memory 412 and some files from remote core 403 that are missing from local core 403 into memory 412.

In one embodiment, bootstrap application 204, upon startup, sends a request to remote server 402 for manifest 406. Remote server 402 then responds to the request by sending manifest 406 to bootstrap application 204. Once receiving manifest 406, bootstrap application 204 uses manifest 406 to determine which core files are present within core memory 306. In this case, because application 108 is initially being used (or the core memory has been cleared), core memory 306 does not include any updateable core files for application 108. Thus, bootstrap application 204 requests each remote core file 404 from remote server 402 and subsequently receives these files. Bootstrap application 204 then can store the received remote core files 404 in memory 412. It will be understood that bootstrap application 204 may store remote core files 404 in core memory 306 first, and then load the core files from core memory 306 to memory 412. Subsequently, native application 202 can execute the received remote core files 404 in memory 412 to provide the media program streaming service.

If the received remote core files 404 have not already been stored in core memory 306, bootstrap application 204 stores the received remote core files 404 in core memory 306 as "updateable core files". These files are updateable at least in part because they are not stored as part of the core that was downloaded from distribution site 106. Also, manifest 406 is stored in core memory 306 as a stored manifest. The use of the stored manifest will be described below in case when a failure of loading a remote core occurs. By storing remote core files 404 in core memory 306, bootstrap application 204 does not need to load the same remote core files 404 from remote server 402 upon a subsequent startup. However, if a remote core file 404 at remote server 402 is updated or a new remote core file 404 is included in remote core 403, then bootstrap application 204 updates application 108.

Figure 5A:
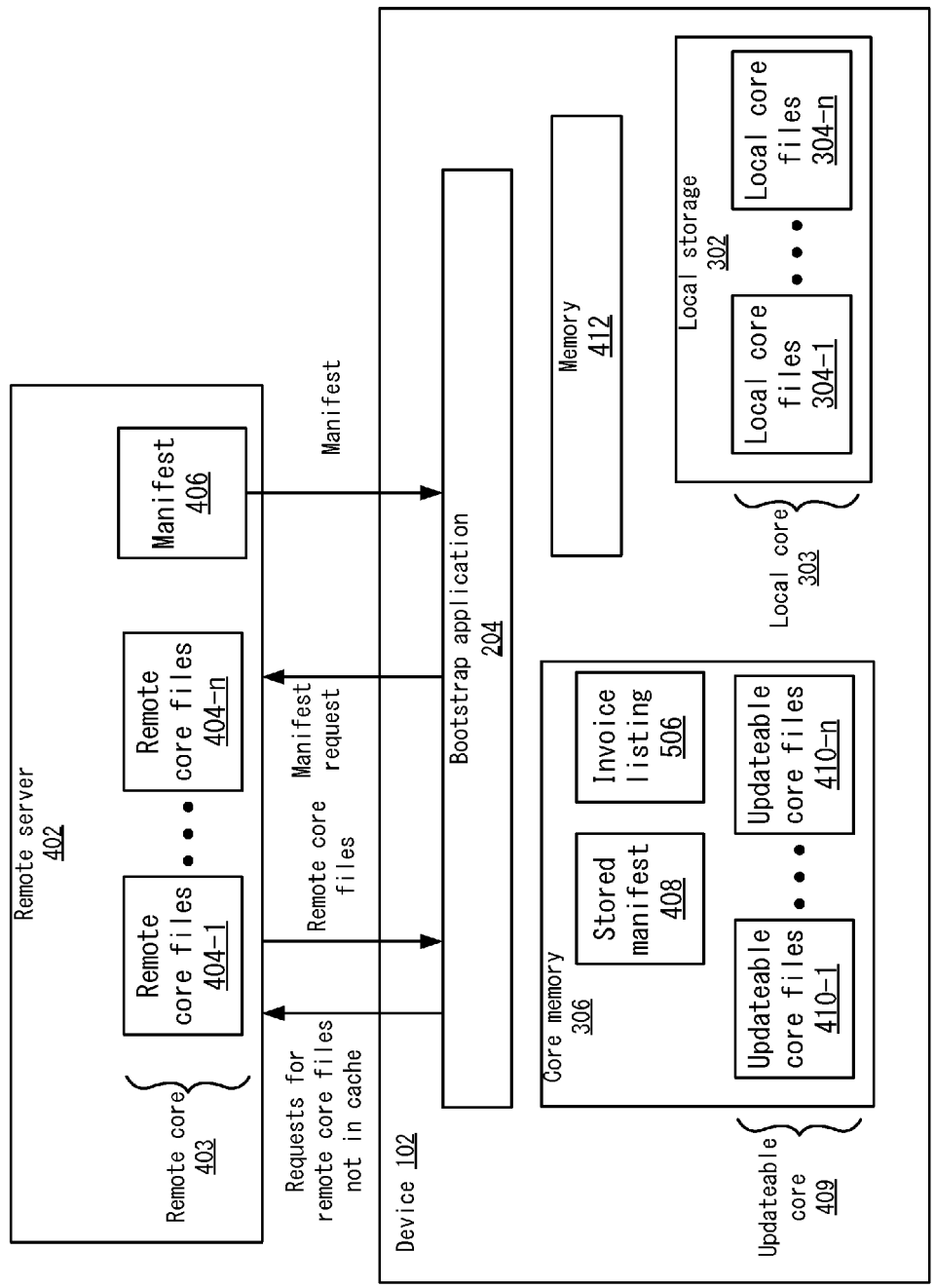
FIG. 5A depicts an example of performing an update of an updateable core according to one embodiment.

At each startup, bootstrap application 204 may check remote server 402 to determine if any updates to remote core 403 have been performed. FIG. 5A depicts an example of performing an update of an updateable core 409 according to one embodiment. Bootstrap application 204 sends a request for manifest 406 to remote server 402 as described above. Remote server 402 then responds with manifest 406, which represents the latest updates to application 108. FIG. 6 depicts an example of a manifest 600 according to one embodiment. In a list 602 (e.g., an array), manifest 600 lists the core files included in the most recent remote core 403. Manifest 600 lists characteristics for each remote core file 404. The characteristics may uniquely identify a remote core file 404 such that bootstrap application 204 can determine if a similar core file is stored in core memory 306. For example, at 604, characteristics of a remote core file named "core_6.js" include a hash of the file contents and an overall size of the file core_6.js. The hash of the contents may uniquely identify the file core_6.js and the overall size of the file core_6.js may measure the storage size. Manifest 406 may also include other characteristics that may uniquely identify the file core_6.js. Manifest 600 further lists similar characteristics for each remote core file 404 included in manifest 600. Also, at 606, manifest 600 includes a root location to download remote core files 404 from.

Referring back to FIG. 5A, bootstrap application 204 checks whether updateable core 409 includes each remote core file 404 listed in manifest 406. For example, for each file name shown in list 602, bootstrap application 204 checks if an updateable core file 410 includes a matching hash in core memory 306. In one example, core memory 306 may include an invoice listing 506 that lists the hash and size for each updateable core file 410. If bootstrap application 204 finds an updateable core file 410 that matches the hash and size (it should be understood that both the hash and size may not be used—e.g., just the hash or the size may be used), then bootstrap application 204 loads the updateable core file 410 into memory 412. If bootstrap application 204 does not find an updateable version of remote core file 404, then, bootstrap application 204 sends a request for the missing remote core file 404 to remote server 402. Remote server 402 sends the requested remote core file 404 to device 102, and bootstrap application 204 loads the received remote core file 404 into memory 412. This process continues as bootstrap application 204 reviews each file in manifest 406 to make sure every remote core file 404 is loaded into memory 412.

Figure 5B:
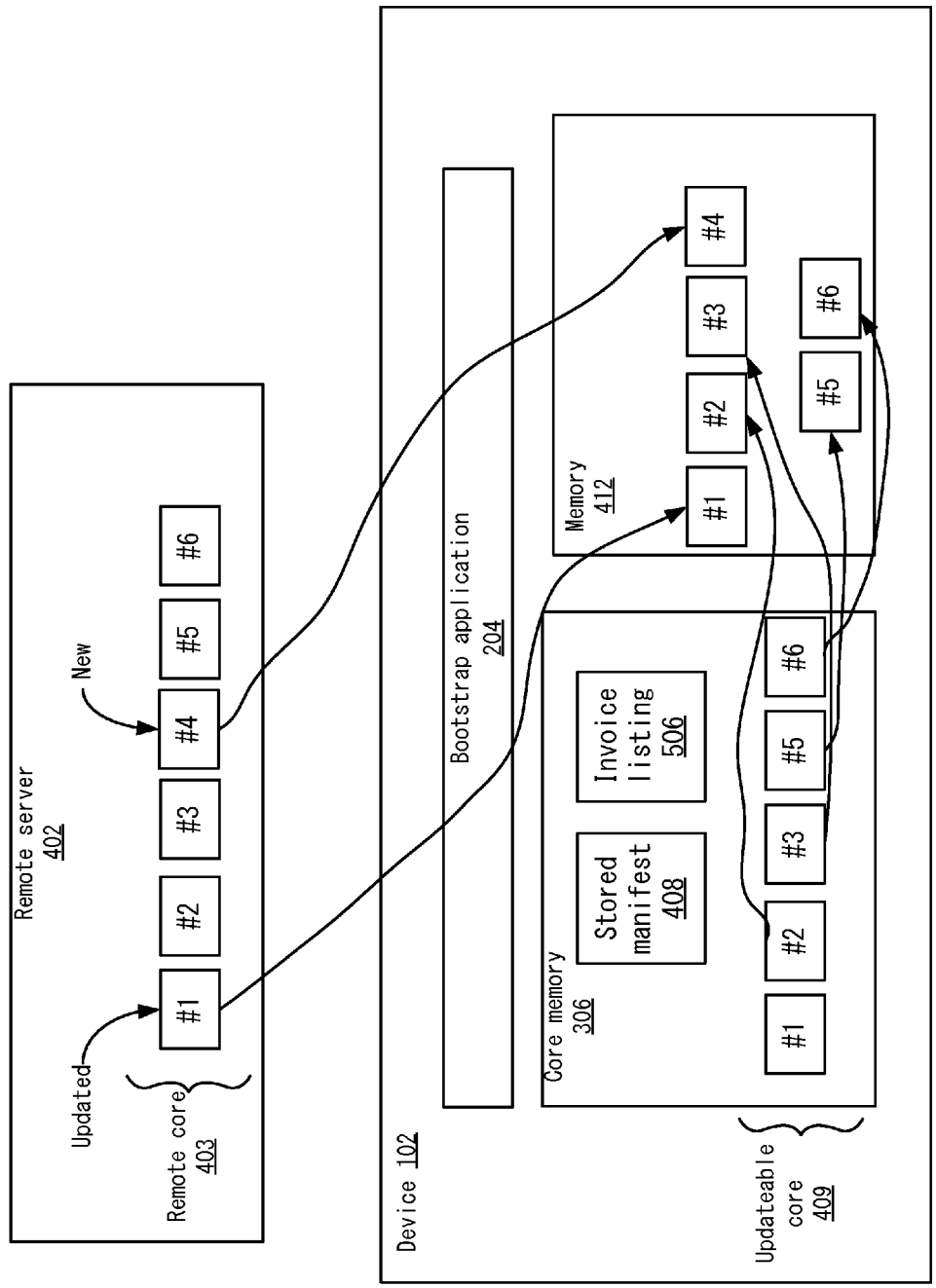
FIG. 5B shows another example of the update process according to one embodiment.

FIG. 5B shows an example of the above update process according to one embodiment. Core memory 306 includes updateable core files 410 of files #1, #2, #3, #5, and #6. However, manifest 406 includes files #1, #2, #3, #4, #5, and #6. Thus, a new file #4 has been added. Also, file #1 has been updated and thus the hash for file #1 in remote core 403 does not match the hash for file #1 in updateable core 409. For example, bootstrap application 204 detects that the hash for file #1 in manifest 406 is not included in invoice listing 506. In light of this, bootstrap application 204 determines that file #4 and file #1 are missing from core memory 306.

If possible, while the update process is occurring, native application 202 may still execute application 108 to allow the user to access the streaming media program service. Bootstrap application 204 first loads files #2, #3, #5, and #6 from core memory 306 into memory 412. This may allow native application 202 to execute application 108. However, in other embodiments, application 108 is updated and then started.

During the update process, bootstrap application 204 sends a request for file #4. Remote server 402 then retrieves remote core file #4 and sends that file to device 102. Bootstrap application 204 then stores remote core file #4 into memory 412. Also, bootstrap application 204 sends a request for file #1 and receives the file from remote server 402. Bootstrap application 204 also stores remote core file #1 into memory 412.

When bootstrap application 204 finishes updating, memory 412 includes core files #1-#6 for application 108. Once all of the files from manifest 406 have been successfully included in memory 412, bootstrap application 204 may verify the loaded core. For example, bootstrap application 204 calls a verify function within the loaded core to have the loaded core verify itself.

Because application 108 is an interpreted application, recompilation of application 108 is not needed after the update process. That is, native application 202 interprets the core files #1-#6 that are stored in memory 412. Once core files #1 and #4 are updated and stored in memory 412, native application 202 can immediately execute them without requiring recompilation.

When a remote core file 404 is retrieved from remote server 402, bootstrap application 204 stores the retrieved remote core file 404 in core memory 306 when it is received. For example, bootstrap application 204 stores file #4 in core memory 306. Further, bootstrap application 204 stores any updated files. For example, bootstrap application 204 stores the retrieved remote core file #1 in core memory 306. Also, any updateable core files 410 that were not included in manifest 406 may be deleted or marked for removal upon the next removal cycle. For example, the previously updateable core file #1 is deleted. In one embodiment, bootstrap application 204 updates invoice listing 506 with the hash and size parameters for any new, updated, or deleted core files. In other embodiments, invoice listing 506 may not be used. Rather, bootstrap application 204 may store manifest 406 as stored manifest 408, which may be used at a later time when a failure occurs when loading any part of remote core 403.

Figure 5C:
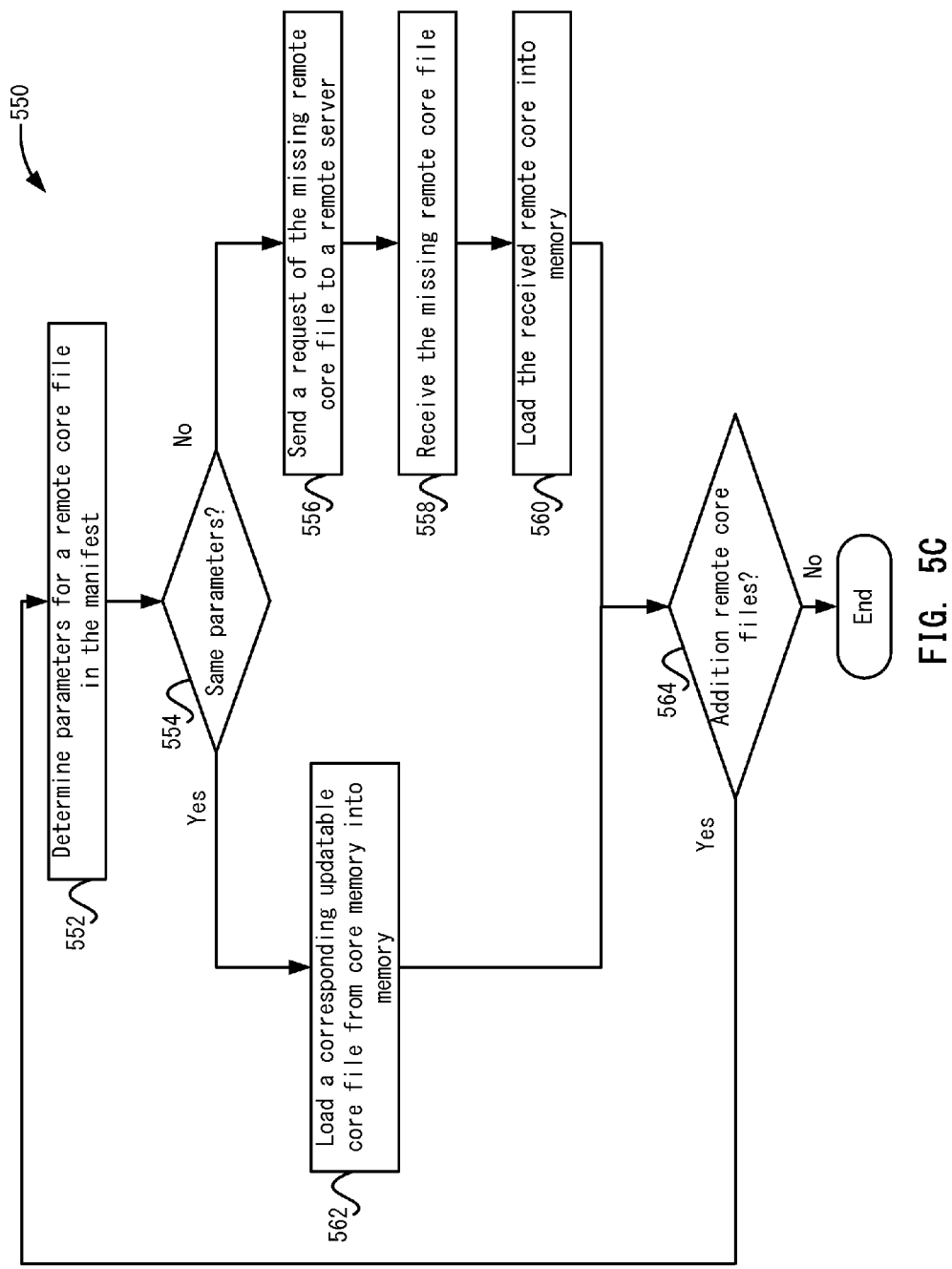
FIG. 5C depicts a simplified flowchart of a method for updating the application according to one embodiment.

FIG. 5C depicts a simplified flowchart 550 of a method for updating application 108 according to one embodiment. At 552, bootstrap application 204 determines characteristics for a remote core file 404 in manifest 406. At 554, bootstrap application 204 determines if invoice listing 506 or stored manifest 408 includes an entry that has the same characteristics. If not, at 556, bootstrap application 204 sends a request of the missing remote core file 404 to remote server 402. At 558, bootstrap application 204 receives the missing remote core file 404. At 560, bootstrap application 204 loads the received remote core 404 into memory 412. If invoice listing 506 or stored manifest 408 does include an entry that has the same parameters, at 562, bootstrap application 204 loads a corresponding updateable core file 410 from core memory 306 into memory 412. At 564, bootstrap application 204 determines if manifest 406 includes additional remote core files 404. If so, the process reiterates to 552 where bootstrap application 204 determines another remote core file 404. If not, the process ends as device 108 includes every updated remote core file 410.

Figure 7:
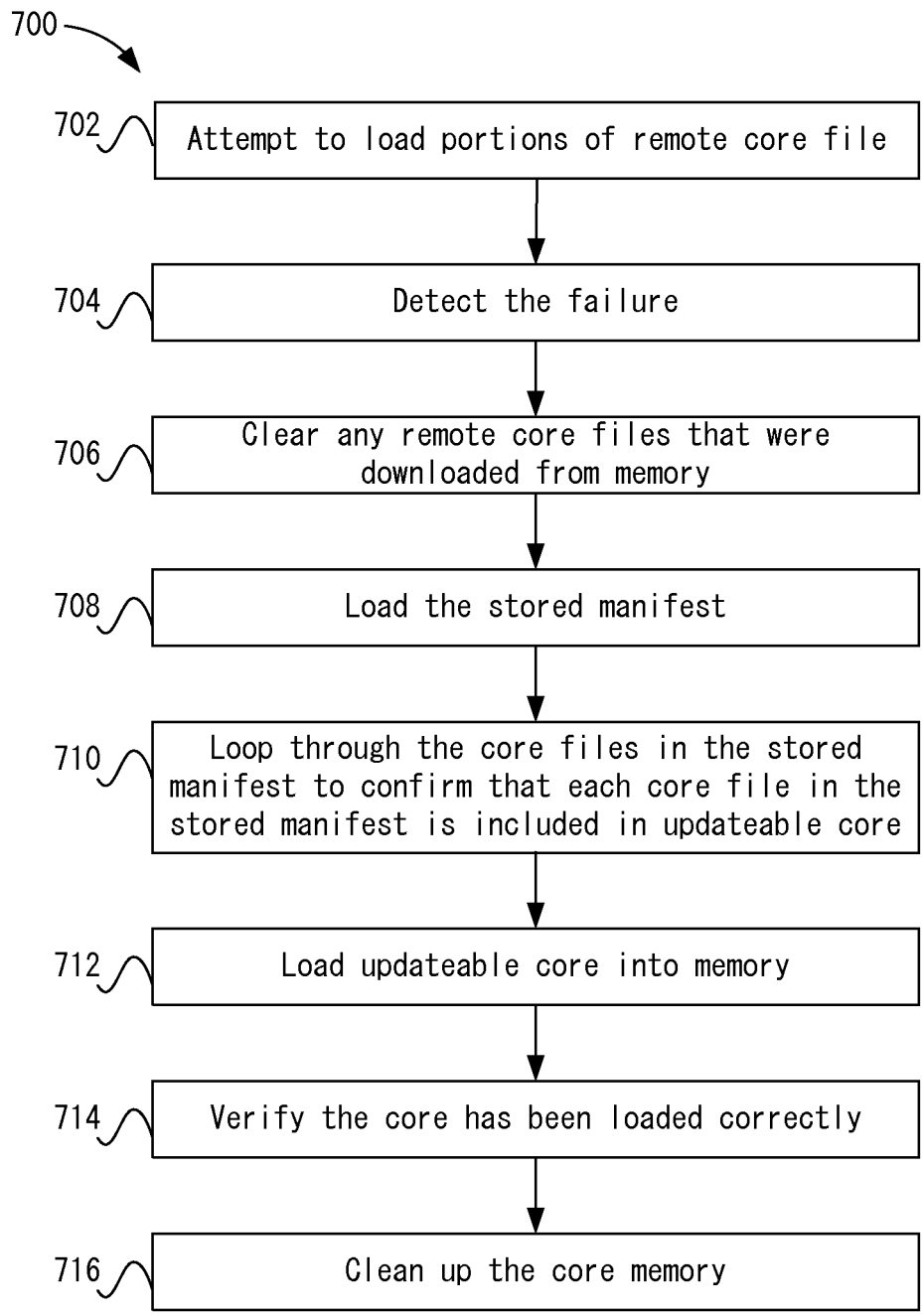
FIG. 7 depicts a simplified flowchart of a method for loading the updateable core in the event of a failure to load remote core according to one embodiment.

As mentioned above, bootstrap application 204 may encounter a failure when loading a remote core file 410. FIG. 7 depicts a simplified flowchart 700 of a method for loading updateable core 409 in the event of a failure to load remote core 403 according to one embodiment. At 702, bootstrap application 204 attempts to load portions of remote core file 404. For example, the process as described above where bootstrap application 204 uses manifest 406 to determine which remote core files 404 to update is performed. At some point, however, bootstrap application 204 may fail to load a remote core file 404. For example, a failure may result because a remote core file 404 could not be downloaded, a file failed to be included in remote core 403, or a remote core 403 failed verification. At 704, bootstrap application 204 detects the failure. At this point, bootstrap application 204 may not use any portion of remote core 403 due to the failure. Thus, at 706, bootstrap application 204 clears any remote core files 404 that were downloaded from memory 412. In other embodiments, bootstrap application 204 may use some remote core files 404 that were downloaded already, but may not use the remote core file that resulted in the failure.

At 708, bootstrap application 204 loads stored manifest 408. For example, stored manifest 408 may be a previous manifest that was retrieved from remote server 402 on a previous startup. Bootstrap application 204 may verify stored manifest 408, such as by determining if expiration criteria for stored manifest 408 indicates the manifest has expired (i.e., stored manifest 408 is too old to be used). However, this discussion assumes that the manifest is valid.

At 710, bootstrap application 204 loops through the core files in stored manifest 408 to confirm that each updateable core file 410 in stored manifest 408 is included in updateable core 409. For example, bootstrap application 204 may verify the hashes and size of the files in stored manifest 408 to updateable core files 410. At 712, upon verification, bootstrap application 204 loads updateable core 409 into memory 412. In this case, any remote core files 404 that were previously retrieved are not included in the core included in memory 412. This may be because remote server 402 may be experiencing issues for the fetching of remote core files 404.

At 714, once all updateable core files 410 have been loaded into memory 412, bootstrap application 204 verifies the core has been loaded correctly. At 716, bootstrap application 204 may clean up core memory 306. For example, any updateable core files 410 that were not included in stored manifest 408 may be removed or marked for removal. After verification, bootstrap application 204 initializes execution of the core loaded into memory 412.

In some cases, bootstrap application 204 may need to use local core 303. For example, core memory 306 may not include an updateable core 409 or device 102 may not include a core memory 306. In either case, bootstrap application 204 loads local core 303 from local storage 302. This is the local core that was included with bootstrap application 204 when loaded from distribution site 106. Thus, in light of any failures with remote core 403 or updateable core 409, bootstrap application 204 falls back on local core 303. Unless device 102 does not support a local core, a user should be able to access the video streaming service. Although local core 303 may not be the most updated version of application 108, the user may still be able to access the service.

Figure 8:
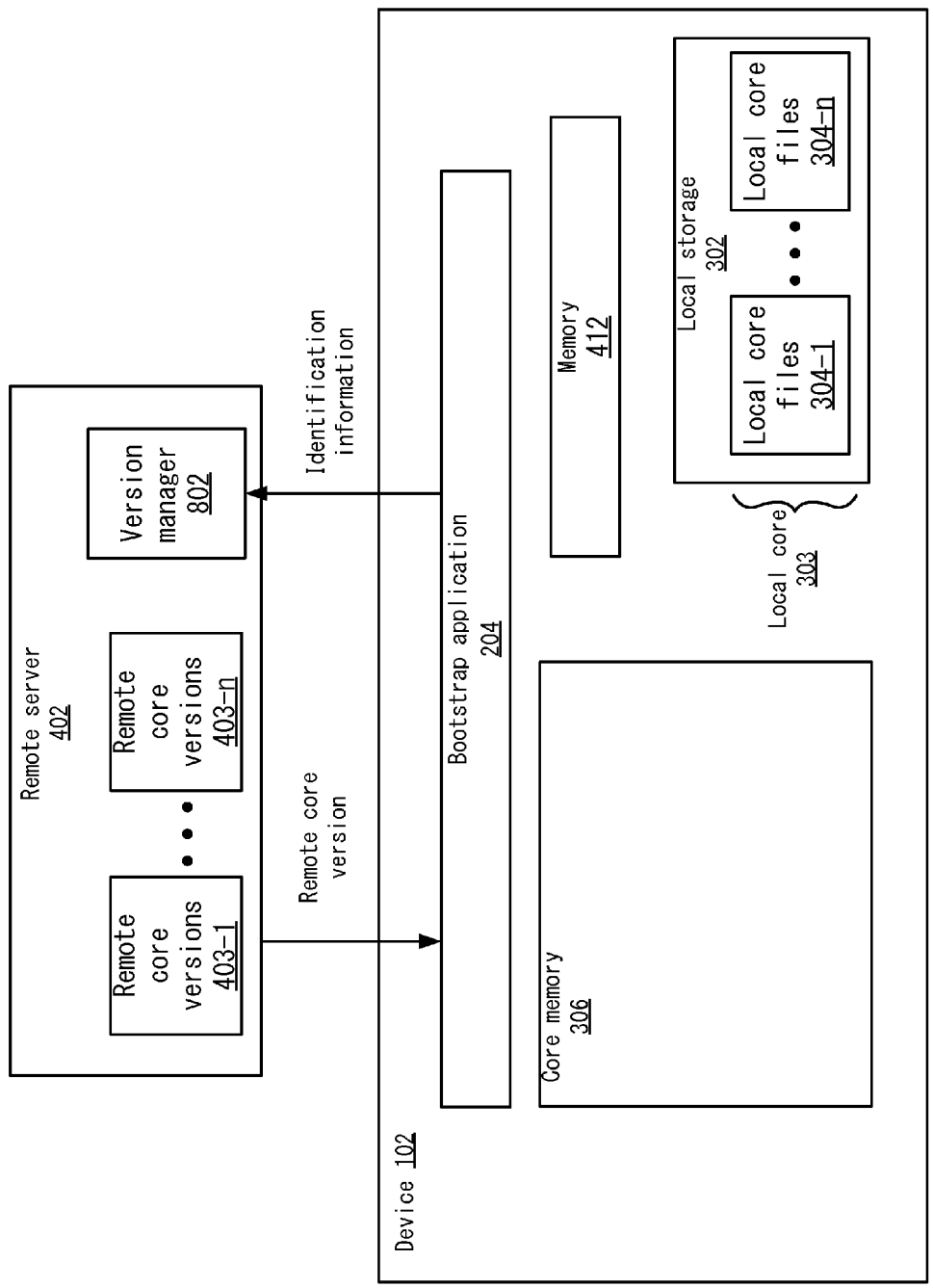
FIG. 8 depicts an example of personalization of a remote core according to one embodiment.

Using remote server 402, the media program streaming service may be able to personalize application 108. FIG. 8 depicts an example of personalization of remote core 403 according to one embodiment. As shown, device 102 may send identification information to remote server 402. The identification information may include a user ID for a user account, platform/device information including what platform it is (e.g., gaming console type), a unique identifier (e.g., serial #, Media Access Control (MAC) address) for device 102, or other unique identification information. A version manager 802 in remote server 402 receives the identification information and can determine which version of remote cores 403 to use. For example, different remote cores 403 may be used for various purposes. In one example, a user may receive a user-specific remote core 403. This personalizes application 108 for the user. In this case, the user provides a user ID that can be used to determine the user-specific version. Additionally, other personalized uses may be providing a beta version for testing to specific users, user-specific testing of a specific remote core 403, or a phased rollout of a new application 108.

Version manager 802 identifies the remote core version using the identification information and sends a manifest to device 102 for that remote core version. Device 102 can then use the manifest for the remote core version to request remote core files 404 from that version.

Figure 9:
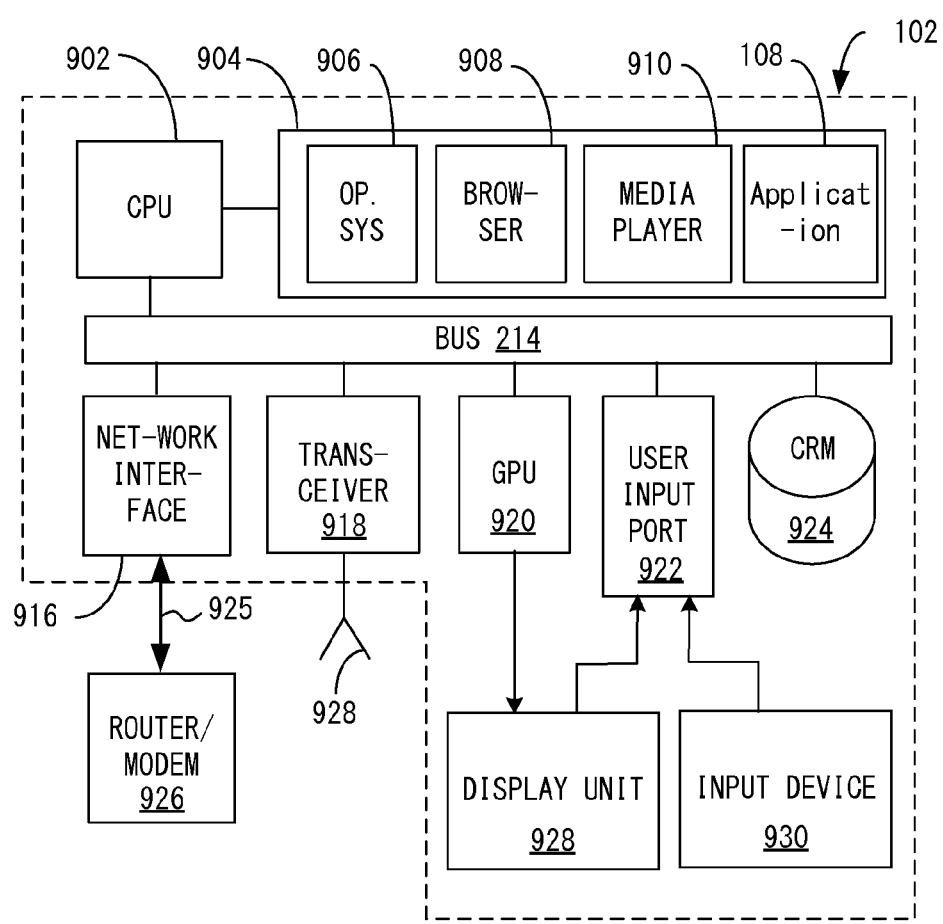
FIG. 9 depicts a diagrammatic view of an example device according to one embodiment.

FIG. 9 depicts a diagrammatic view of an example device 102 according to one embodiment. In selected embodiments, device 102 may include a processor 902 operatively coupled to a processor memory 904, which holds binary-coded functional modules for execution by the processor 902. Such functional modules may include an operating system 906 for handling system functions such as input/output and memory access, a browser 908 for accessing information via the World Wide Web or similar network infrastructure, a media player 910 for playing streaming video and communicating with a streaming video system, and an application 108 for providing a streaming media program service for videos being played by the media player 910.

A bus 914 or other communication component may support communication of information within device 102. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium in a storage device 924 may be connected to the bus 914 and store static information and instructions for the processor 902; for example, the storage device 924 may store the modules 906, 908, 910 and 912 when the device 102 is powered off, from which the modules may be loaded into the processor memory 904 when the device 102 is powered up. The storage device 924 may include a non-transitory computer-readable medium holding information, instructions, or some combination thereof, for example instructions that when executed by the processor 902, cause the device 102 to perform one or more operations of a method as described herein.

A communication interface 916 may also be connected to the bus 914. The communication interface 916 may provide or support two-way data communication between the device 102 and one or more external devices, e.g., remote server 402, optionally via a router/modem 926 and a wired or wireless connection 925. In the alternative, or in addition, the device 102 may include a transceiver 918 connected to an antenna 928, through which the client 900 may communicate wirelessly with a base station for a wireless communication system or with the router/modem 926.

The device 102 may be connected (e.g., via the bus 914 and graphics processing unit 920) to a display unit 928. A display 928 may include any suitable configuration for displaying information to a user of the device 102. For example, a display 928 may include or utilize a cathode ray tube (CRT), liquid crystal display (LCD), touchscreen LCD (e.g., capacitive display), light emitting diode (LED) display, projector, or other display device to present information to a user of the device 102 in a visual display.

One or more input devices 930 (e.g., an alphanumeric keyboard, microphone, keypad, remote controller, game controller, camera or camera array) may be connected to the bus 914 via a user input port 922 to communicate information and commands to the device 102. In selected embodiments, and input device 930 may provide or support control over the positioning of a cursor. Such a cursor control device, also called a pointing device, may be configured as a mouse, a trackball, a track pad, touch screen, gesture detection systems, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

The device 102 may be used to transmit, receive, display, or the like one or more streaming video segments. In selected embodiments, such transmitting, receiving, and displaying may be in response to the processor 902 executing one or more sequences of one or more instructions contained in main memory 904. Such instructions may be read into main memory 904 from another non-transitory computer-readable medium (e.g., a storage device 924).

Execution of sequences of instructions contained in main memory 904 may cause a processor 902 to perform one or more of the procedures or steps described herein. In selected embodiments, one or more processors 902 in a multi-processing arrangement may also be employed to execute sequences of instructions contained in main memory 904. Alternatively, or in addition thereto, firmware may be used in place of, or in combination with, software instructions to implement procedures or steps in accordance with the features and aspects disclosed herein. Thus, embodiments in accordance with the features and aspects disclosed herein may not be limited to any specific combination of hardware circuitry and software.

The term "non-transitory computer-readable medium" as used herein may refer to any medium that participates in holding instructions for execution by a processor 902, or that stores data for processing by a computer. Such a medium may take many forms, including but not limited to, non-volatile media, volatile media, and temporary storage media (e.g., cache memory). Non-volatile media may include optical or magnetic disks, such as a storage device 924. Volatile media may include dynamic memory, such as main memory 904. Common forms of non-transitory computer-readable media may include, for example, a hard (magnetic media) disk, magnetic tape, or any other magnetic medium, a CD-ROM, DVD, Blu-ray or other optical disc or medium, RAM, PROM, EPROM, FLASH-EPROM, any other memory card, chip, or cartridge, or any other memory medium from which a computer can read.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for updating a media program streaming application for a media program streaming service, the method comprising:
    downloading the media program streaming application including a bootstrap application through a distribution site to a computing device, wherein initial installation of the media program streaming application is coordinated through the distribution site to approve the media program streaming application for download;
    upon startup of the media program streaming application, running the bootstrap application to determine if the media program streaming application on the computing device needs to be updated;
    sending, by the bootstrap application, a request for a manifest to a remote server;
    receiving, by the bootstrap application, the manifest from the remote server, wherein the manifest lists a set of remote core files stored at the remote server;
    reviewing, by the bootstrap application, the manifest to determine if a core memory on the computing device contains a set of updateable core files that correspond to the set of remote core files;
    for each remote core file, performing:
        if an updateable core file is present in the core memory that matches a remote core file, loading the updateable core file from the core memory into an application execution memory; and
        if the updateable core file that matches the remote core file is not present in the core memory, requesting the remote core file from the remote server, receiving the remote core file from the remote server, and loading the received remote core file into the application execution memory, the remote core file being received without communicating with the distribution site; and
    executing the loaded updateable core files and the received remote core files in the application execution memory without recompilation of the loaded updateable core files or remote core files to provide the streaming media program service.

2. The method of claim 1, further comprising if the remote core file is requested from the remote server and received, storing the received remote core file in the core memory.

3. The method of claim 1, wherein:
    a set of local core files is received through the distribution site and stored on local storage of the computing device, and
    the set of local core files are not executed to provide the media program streaming service.

4. The method of claim 3, the method further comprising:
    determining if a failure results in requesting or receiving a remote core file;
    determining updateable core files do not exist; and
    executing the set of local core files to provide the media program streaming service.

5. The method of claim 1, wherein when a failure results in requesting remote core file or the manifest from the remote server, the method further comprising:
    determining a stored manifest from a previous update process;
    reviewing the stored manifest to determine if the core memory includes the set of remote core files included on the manifest; and
    loading each of the updateable core files from the core memory that match the set of remote core files included in the stored manifest.

6. The method of claim 1, wherein the bootstrap application determines if the media program streaming application on the computing device needs to be updated upon each startup of the media program streaming application.

7. The method of claim 1, wherein changes to the media program streaming application are performed by including changes to remote core files in the manifest.

8. The method of claim 1, further comprising cleaning the core memory by deleting any updateable core files from the core memory that are not on the manifest.

9. The method of claim 1, further comprising upon loading the updateable core files and the received remote core files in the application execution memory that correspond to the set of remote core files in the manifest, verifying the loaded updateable core files and the received remote core files to verify the media program streaming application can be executed.

10. The method of claim 1, wherein the loaded updateable core files and the received remote core files are executed by a native application executing on the computing device, the native application including an interpreter that interprets the loaded updateable core files and the received remote core files without needing recompilation of the loaded updateable core files or the received remote core files.

11. The method of claim 1, wherein reviewing the manifest comprises:
    determining characteristics that uniquely identify each of the set of remote core files; and
    determining if updateable core files in core memory include characteristics that match the characteristics of the set of remote core files.

12. The method of claim 11, further comprising:
    determining an invoice listing stored in the core memory that lists parameters that uniquely identify each of the updateable core files; and
    consulting the invoice listing to determine a cached core file includes characteristics that match the characteristics of a remote core file in the manifest.

13. The method of claim 12, wherein if the cached core file that matches the remote core file is not present in the core memory, the remote core file has been updated in the media program streaming application.

14. The method of claim 12, wherein if the cached core file that matches the remote core file is not present in the core memory, the remote core file has been newly added to the media program streaming application.

15. The method of claim 1, further comprising sending identification information to the remote server, wherein the remote server uses the identification information to determine a version of the media program streaming application that is specialized for the identification information.

16. A non-transitory computer-readable storage medium containing instructions for updating a media program streaming application for a media program streaming service, the instructions, when executed, control a computing device to perform:

downloading the media program streaming application including a bootstrap application through a distribution site, wherein initial installation of the media program streaming application is coordinated through the distribution site to approve the media program streaming application for download;

upon startup of the media program streaming application, running the bootstrap application to determine if the media program streaming application needs to be updated;

sending, by the bootstrap application, a request for a manifest to a remote server;

receiving, by the bootstrap application, the manifest from the remote server, wherein the manifest lists a set of remote core files stored at the remote server;

reviewing, by the bootstrap application, the manifest to determine if a core memory on the computing device contains a set of updateable core files that correspond to the set of remote core files;

for each remote core file, performing:

if an updateable core file is present in the core memory that matches a remote core file, loading the updateable core file from the core memory into an application execution memory; and if the updateable core file that matches the remote core file is not present in the core memory, requesting the remote core file from the remote server, receiving the remote core file from the remote server, and loading the received remote core file into the application execution memory, the remote core file being received without communicating with the distribution site; and executing the loaded updateable core files and the received remote core files in the application execution memory without recompilation of the loaded updateable core files or remote core files to provide the streaming media program service.

17. The non-transitory computer-readable storage medium of claim 16, wherein:

a set of local core files is received through the distribution site and stored on local storage of the computing device, and the set of local core files are not executed to provide the media program streaming service.

18. The non-transitory computer-readable storage medium of claim 1, wherein when a failure results in requesting remote core file from the remote server, the instructions further control the computer device to perform:

determining a stored manifest from a previous update process;

reviewing the stored manifest to determine if the core memory includes the set of remote core files included on the manifest; and loading each of the updateable core files from the core memory that match the set of remote core files included in the stored manifest.

19. The non-transitory computer-readable storage medium of claim 16, wherein the loaded updateable core files and the received remote core files are executed by a native application found on the computing device, the native application including an interpreter that interprets the loaded updateable core files and the received remote core files without needing recompilation of the loaded updateable core files or the received remote core files.

20. A system for updating a media program streaming application for a media program streaming service, the system comprising:

a remote server storing a remote core for the media program streaming application and a manifest listing a set of remote core files for the remote core; and a client device comprising:

one or more computer processors; and a non-transitory computer-readable storage medium comprising instructions, that when executed, control the one or more computer processors to perform:

downloading the media program streaming application including a bootstrap application through a distribution site, wherein initial installation of the media program streaming application is coordinated through the distribution site to approve the media program streaming application for download;

upon startup of the media program streaming application, running the bootstrap application to determine if the media program streaming application needs to be updated;

sending, by the bootstrap application, a request for a manifest to the remote server;

receiving, by the bootstrap application, the manifest from the remote server, wherein the manifest lists a set of remote core files stored at the remote server;

reviewing, by the bootstrap application, the manifest to determine if a core memory on the client device contains a set of updateable core files that correspond to the set of remote core files;

for each remote core file, performing:

if an updateable core file is present in the core memory that matches a remote core file, loading the updateable core file from the core memory into an application execution memory; and if the updateable core file that matches the remote core file is not present in the core memory, requesting the remote core file from the remote server, receiving the remote core file from the remote server, and loading the received remote core file into the application execution memory, the remote core file being received without communicating with the distribution site; and executing the loaded updateable core files and the received remote core files in the application execution memory without recompilation of the loaded updateable core files or remote core files to provide the streaming media program service.

\* \* \* \* \*

UNITED STATES PATENT AND TRADEMARK OFFICE
CERTIFICATE OF CORRECTION

| | | |
|---|---|---|
| PATENT NO. | : 9,210,211 B2 | Page 1 of 1 |
| APPLICATION NO. | : 13/891746 | |
| DATED | : December 8, 2015 | |
| INVENTOR(S) | : Gomes et al. | |

It is certified that error appears in the above-identified patent and that said Letters Patent is hereby corrected as shown below:

In the claims

Column 15, claim 18, line 48, delete "claim 1," and insert --claim 16,--.

Signed and Sealed this
Twenty-ninth Day of March, 2016

Michelle K. Lee
*Director of the United States Patent and Trademark Office*